US008374322B2

United States Patent
Yamagishi

(10) Patent No.: US 8,374,322 B2
(45) Date of Patent: Feb. 12, 2013

(54) TELEPHONE COMMUNICATIONS SYSTEM INCREASING A RECEPTION COUNT TWOFOLD

(75) Inventor: Junichi Yamagishi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 783 days.

(21) Appl. No.: 12/538,420

(22) Filed: Aug. 10, 2009

(65) Prior Publication Data

US 2010/0034329 A1 Feb. 11, 2010

(30) Foreign Application Priority Data

Aug. 11, 2008 (JP) ................. 2008-206510

(51) Int. Cl.
*H04M 11/00* (2006.01)
(52) U.S. Cl. .................. 379/93.18; 379/283
(58) Field of Classification Search ............... 379/93.18, 379/283
See application file for complete search history.

(56) References Cited

U.S. PATENT DOCUMENTS

| 4,604,713 | A |   | 8/1986  | Godard et al. |
| 4,710,952 | A | * | 12/1987 | Kobayashi ............ 379/269 |
| 5,073,941 | A |   | 12/1991 | Locke |
| 6,665,350 | B1| * | 12/2003 | Bartkowiak ........... 375/275 |
| 6,731,745 | B1|   | 5/2004  | Goto |

FOREIGN PATENT DOCUMENTS

| JP | 55-77291 A   | 6/1980  |
| JP | 02-069093 A  | 3/1990  |
| JP | 06-066980 B2 | 1/1994  |
| JP | 2000-324519 A| 11/2000 |
| WO | 97/46030 A1  | 12/1997 |

* cited by examiner

Primary Examiner — Alexander Jamal
(74) Attorney, Agent, or Firm — Sughrue Mion, PLLC

(57) ABSTRACT

A telephone communications system includes a quantizing device quantizing a multifrequency signal at a sampling frequency which is twice or more as larger as a sampling frequency necessary for sampling the multifrequency signal to produce quantized data, a low-pass filter low-pass filtering the quantized data at a cutoff frequency higher than a maximum frequency of the multifrequency signal to produce low-pass filtered data, and a multifrequency signal receiver alternately performing an odd-numbered receiver processing and an even-numbered receiver processing on the low-pass filtered data.

9 Claims, 2 Drawing Sheets

TELEPHONE COMMUNICATIONS SYSTEM INCREASING A RECEPTION COUNT TWOFOLD

This application is based upon and claims the benefit of priority from Japanese patent application No. 2008-206510, filed on Aug. 11, 2008, the disclosure of which is incorporated herein in its entirety by reference.

BACKGROUND OF THE INVENTION

1. Technical Field

This invention relates to a telephone communications system and, in particular, to a method of increasing a reception count in a case of constructing a multifrequency signal receiver using the Goertzel algorithm by a digital signal processor (DSP).

2. Background Art

As is well known in the art, there are a dual tone multi-frequency (DTMF) signal and a multi-frequency code (MF) signal as a multifrequency signal (a selection signal). The DTMF signal is a signal obtained by combining two frequencies (one selected from a low frequency group and one selected from a high frequency group) in a speech frequency band. The low frequency group consists of four frequencies of 697 Hz, 770 Hz, 852 Hz, and 941 Hz. The high frequency group consists of four frequencies of 1209 Hz, 1366 Hz, 1477 Hz, and 1633 Hz. On the other hand, the MF signal consists of a selection number by pulses obtained by combining two frequencies selected from six frequencies of 700 Hz, 900 Hz, 1100 Hz, 1300 Hz, 1500 Hz, and 1700 Hz. Accordingly, the DTMF signal and the MF signal have the maximum frequency of 1633 Hz and 1700 Hz, respectively.

Throughout the instant specification, the DTMF signal and the MF signal are collectively called the multifrequency signal. That is, the multifrequency signal comprises the DTMF signal and/or the MF signal.

In a multifrequency signal receiver for receiving such a multifrequency signal, DFT (Discrete Fourier Transform) for each of the prescribed frequencies with a method that uses the Goertzel algorithm is carried out and strength of each frequency component is detected. Herein, the Goertzel algorithm is an algorithm which performs DFT similarly to a FFT (Fast Fourier Transform) algorithm, and is advantageously used when only a limited number of frequency components are to be detected (for example, see Japanese Unexamined Patent Application Publication of Tokkai No. 2000-324519 or JP-A2000-324519 (which will be also called Patent Document 1), which corresponds to U.S. Pat. No. 6,731,745).

In a telephone communications system, it is necessary to increase a reception count in the multifrequency signal receiver. However, it is difficult costwise to improve a spec of the DSP (digital signal processor) for carrying out a receiver processing.

Various prior art documents related to the present invention are known. By way of example, Japanese Unexamined Patent Application Publication of Tokkai No. Hei 2-69093 or JP-A 2-69093 (which will be also called Patent Document 2) discloses an technical idea for simultaneously receiving, in one multi-frequency receiver, multifrequency signals from a plurality of subscribers by periodically switching the connection of channel paths therebetween.

Patent Document 2 merely discloses a time division technique which recognizes a timing of an ON/OFF time of the DTMF signal (the multifrequency signal) and uses an OFF time for detection processing of other DTMP signals (multifrequency signals).

Japanese Examined Patent Application Publication of Tokou No. Hei 6-66980 or JP-B 6-66980 (which will be also called Patent Document 3), which corresponds to U.S. Pat. No. 4,604,713, discloses a multi-frequency receiver including an ADC (analog-to-digital converter) for sampling an input signal at 8 KHz and converting to a digital signal and a low-pass filter (LPF) having a frequency bandwidth ranging from 0 to 2 KHz. In Patent Document 3, an output signal of the LPF is resampled at the frequency of 4 KHz before being fed into first and second Hilbert transformer type filters. The first Hilbert transformer type filter is a band-pass filter supplying the in-phase and quadrature components of the signals of the so-called low-frequency groups (627 Hz; 770 Hz; 852 Hz and 941 Hz). The second Hilbert transformer type filter is a band-pass filter supplying the in-phase and qudrature components of the signals of the so-called high-frequency groups (1209 Hz; 1336 Hz; 1477 Hz and 1633 Hz). A first polar coordinates converter processes an output signal of the first Hilbert transformer type filter to convert signals from Cartesian coordinates into polar coordinates. A second polar coordinates converter processes an output signal of the second Hilbert transformer type filter to convert signals from Cartesian coordinates into polar coordinates.

A tone detector disclosed in Patent Document 3 uses a sampling frequency of 8 kHz in a telephone system. In Patent Document 3, data supplied to the detector at the same sampling time interval is used as sampling data without time division.

SUMMARY

An exemplary object of the invention is to provide a telephone communications system which is capable of increasing a reception count in the receiver processing that is twice of a conventional one.

A telephone communications system according to a first exemplary aspect of the invention has a function for receiving a multifrequency signal. The telephone communications system includes a quantizing device quantizing the multifrequency signal at a sampling frequency which is twice or more as larger as a sampling frequency necessary for sampling the multifrequency signal to produce quantized data, a low-pass filter low-pass filtering the quantized data at a cutoff frequency higher than a maximum frequency of the multifrequency signal to produce low-pass filtered data, and a multifrequency signal receiver alternately performing an odd-numbered receiver processing and an even-numbered receiver processing on the low-pass filtered data.

A method according to a second exemplary aspect of the invention is of receiving a multifrequency signal. The method includes quantizing the multifrequency signal at a sampling frequency which is twice or more as larger as a sampling frequency necessary for sampling the multifrequency signal to produce quantized data, low-pass filtering the quantized data at a cutoff frequency higher than a maximum frequency of the multifrequency signal to produce low-pass filtered data, and alternately performing an odd-numbered receiver processing and an even-numbered receiver processing on the low-pass filtered data.

BRIEF DESCRIPTION OF THE DRAWINGS

The above feature and advantages of the present invention will be more apparent from the following description of certain exemplary embodiments taken in conjunction with the accompanying drawing, in which.

DETAILED DESCRIPTION OF EXEMPLARY EMBODIMENT

Now, the description will proceed to the principle of the present invention. In the manner which is described above, the DTMF signal and the MF signal have the maximum frequency of 1633 Hz and 1700 Hz, respectively. Accordingly, a sampling frequency necessary for quantizing speech data may satisfy 4 KHz or more. In addition, in a telephone communications system, a sampling frequency for quantizing speech data is 8 kHz. From the viewpoint of the above-mentioned two matters, the DSP may alternately receive signal data on processing of the multifrequency signal receiver and it is possible to increase the reception count twofold by alternately performing the receiver processing.

Figure 1:
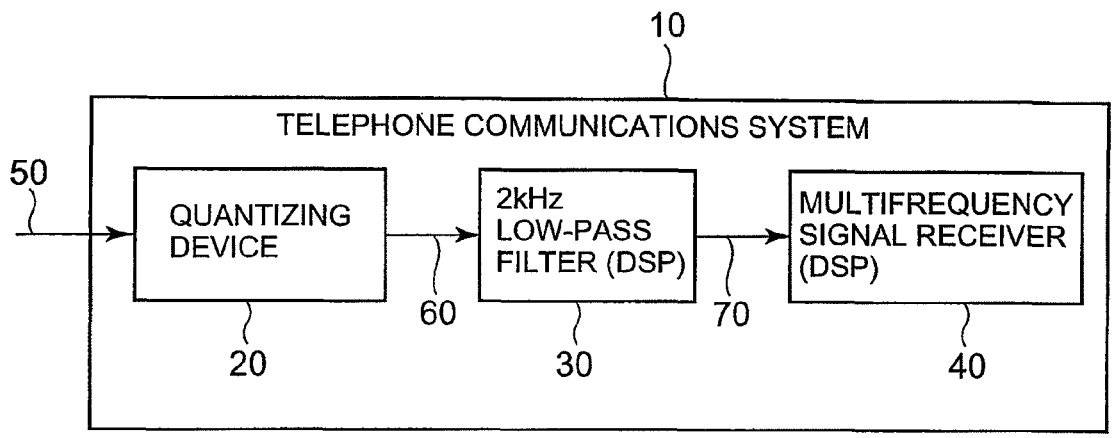
FIG. 1 is a schematic block diagram of a telephone communications system according to an exemplary embodiment of the present invention.

Referring to FIG. 1, the description will proceed to a telephone communications system 10 according to an exemplary embodiment of the present invention. FIG. 1 is a schematic block diagram of the telephone communications system 10. The illustrated telephone communications system 10 is a telephone communications system having a multifrequency signal receiver function.

The illustrated telephone communications system 10 comprises a quantizing device 20 having a sampling frequency fs of 8 kHz or more, a 2 kHz low-pass filter 30, and a multifrequency signal receiver 40. In the example being illustrated, each of the low-pass filter 30 and the multifrequency signal receiver 40 is implemented by a DSP (digital signal processor).

A multifrequency signal 50 is supplied to the telephone communications system 10 as speech data. The quantizing device 20 is a device for quantizing the multifrequency signal 50 at the sampling frequency fs which is not less than a minimum sampling frequency of 8 kHz in a telephone system. Quantized data 60 is PCM (pulse code modulation) data obtained by quantizing the multifrequency signal 50 by the quantizing device 20 at the sampling frequency fs of 8 kHz or more. That is, the quantizing device 20 is a quantizing arrangement for quantizing the multifrequency signal 50 at the sampling frequency fs which is twice or more of a sampling frequency required to sample the multifrequency signal 50 to produce the quantized data 60.

Although the sampling frequency fs of the quantizing device 20 is 8 kHz or more in the exemplary embodiment of this invention, the sampling frequency fs of the quantizing device 20 may be twice or more as larger as a sampling frequency necessary for sampling the multifrequency signal 50.

The 2 kHz low-pass filter 30 is a low-pass filter having a cutoff frequency fc of 2 kHz. That is, the 2 kHz low-pass filter 30 has the cutoff frequency fc which is higher than the maximum frequency of the multifrequency signal 50. 2 kHz low-pass filtered data 70 is input data supplied to the multifrequency signal receiver 40 that is filtered by the 2 kHz low-pass filter 30. In other words, the 2 kHz low-pass filter 30 comprises a low-pass filter for low-pass filtering the quantized data 60 at the cutoff frequency fc which is higher than the maximum frequency of the multifrequency signal 50 to produce the 2 kHz low-pass filtered data 70.

Although the cutoff frequency fc of the low-pass filter 30 is equal to 2 kHz in the exemplary embodiment of this invention, the cutoff frequency fc of the low-pass filter 30 may be a frequency which is higher than a maximum frequency of the multifrequency signal 50.

The multifrequency signal receiver 40 is a device performing a multifrequency signal reception by processing the 2 kHz low-pass filtered signal 70 in the manner which will later be described.

Figure 2:
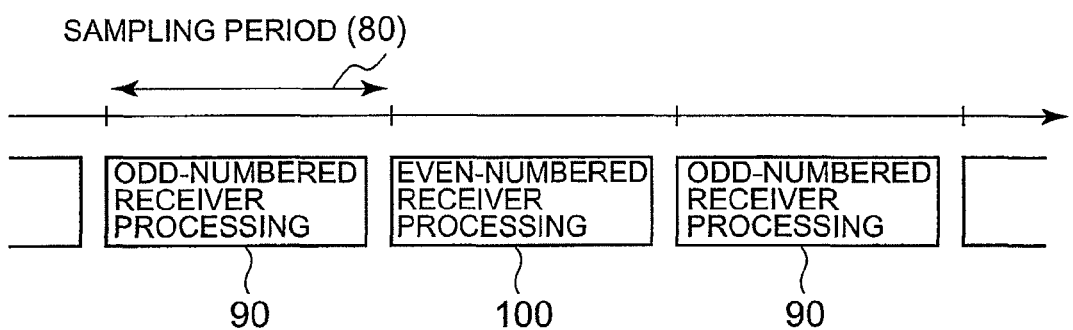
FIG. 2 is a time chart representing, in time sequence, a multifrequency signal receiving processing every sampling period of 125 μsec in a multifrequency signal receiver of the telephone communication system illustrated in FIG. 1.

FIG. 2 is a time chart representing, in time sequence, the multifrequency signal receiving processing every sampling period 80 of 125 μsec in the multifrequency signal receiver 70.

Referring now to FIGS. 1 and 2, description will be made as regards operation of the telephone communications system 10.

When the multifrequency signal 50 is supplied to the telephone communications system 10, the multifrequency signal 50 is converted into the quantized data 60 by the quantizing device 20 having the sampling frequency fs of 8 kH or more. The quantized data 60 is filtered by the 2 kHz low-pass filter 30 into the 2 kHz low-pass filtered data 70 into which components beyond the maximum frequency band of the multifrequency signal are attenuated. The 2 kHz low-pass filtered data 70 is supplied to the multifrequency signal receiver 40.

It will be assumed that the quantizing device 20 has the sampling frequency fs of 8 kHz. In this event, the multifrequency signal receiver 40 is supplied with the 2 kHz low-pass filtered data 70 every the sampling period 80 of 125 μsec. Inasmuch as the maximum frequency of the multifrequency signal 50 is equal to 1633 Hz or 1700 Hz in the DTMF signal and the MF signal, respectively, it is possible to analyze the 2 kHz low-pass filtered data 70 using a sampling frequency of 4 kHz or more.

The multifrequency signal receiver 40 groups parallel concurrent receiving processable receivers at the sampling period 80 of 125 μsec to two and results in doubling a reception count which can concurrently performs. In the example being illustrated, two grouping represents an odd-numbered receiver processing 90 and an even-numbered receiver processing 100 in FIG. 2.

At any rate, the multifrequency signal receiver 40 alternately performs the odd-numbered receiver processing 90 and the even-numbered receiver processing 100 on the 2 kHz low-pass filtered data 70.

Figure 3:
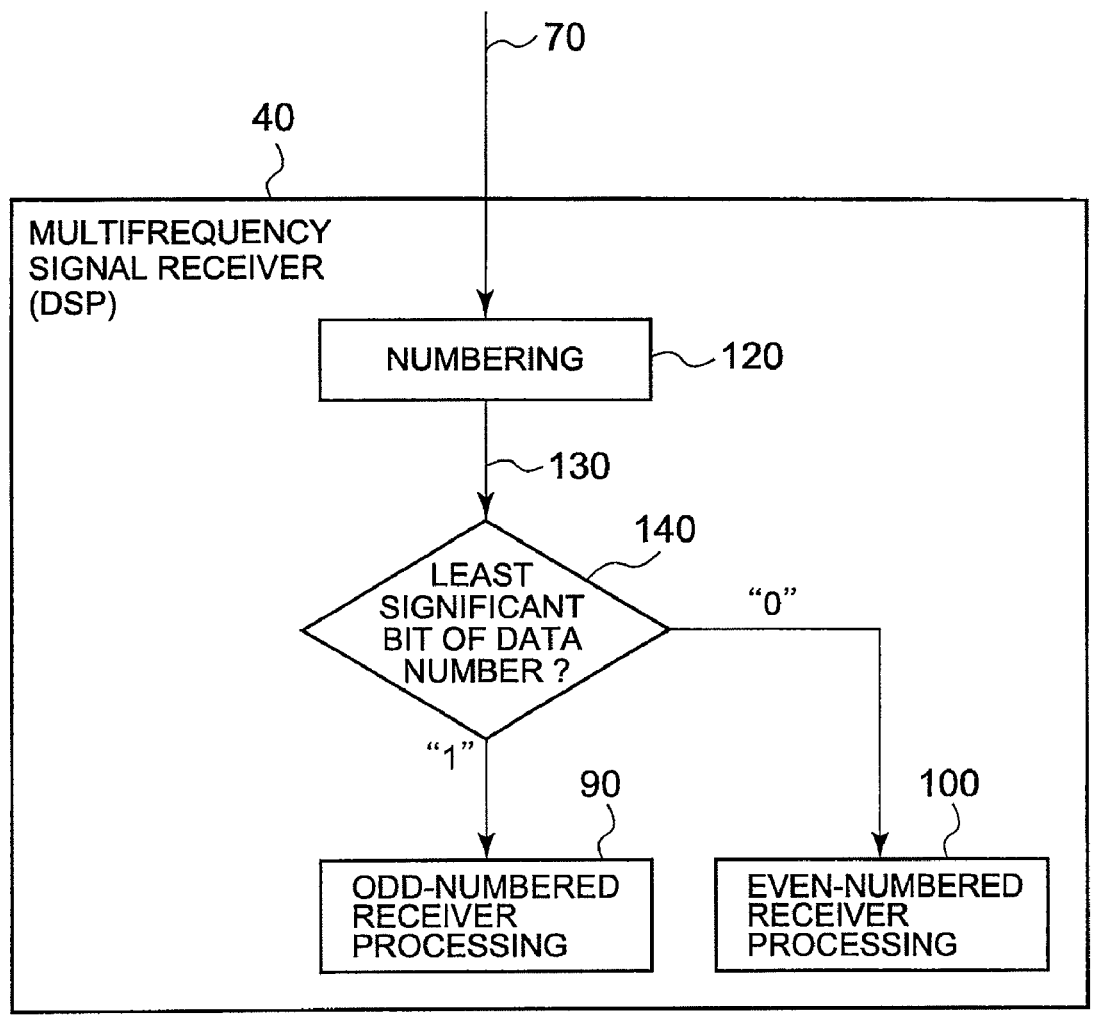
FIG. 3 is a view showing the multifrequency signal receiver illustrated in FIG. 1.

FIG. 3 is a view showing an overview of the multifrequency signal receiver 40 illustrated in FIG. 1. When the 2 kHz low-pass filtered data 70 is supplied to the multifrequency signal receiver 40, the multifrequency signal receiver 40 numbers the 2 kHz low-pass filtered data 70 (step 120). The multifrequency signal receiver 40 produces numbered data 130 with a data number. Subsequently, the multifrequency signal receiver 40 discriminates, on the numbered data 130, a least significant bit of data number added thereto (step 140). If the least significant bit of the data number is "0", the multifrequency signal receiver 40 performs the even-numbered receiver processing 100 (step 100). If the least significant bit of the data number is "1", the multifrequency signal receiver 40 performs the odd-numbered receiver processing 90 (step 90).

In other words, the step 120 of the multifrequency signal receiver 40 serves as a numbering processing unit which numbers the low-pass filtered data 70 to produce the numbered data 130 with the data number. The step 140 of the multifrequency signal receiver 40 serves as a least significant bit discriminating unit which discriminates a least significant bit of the data number added to the numbered data 130. The step 100 of the multifrequency signal receiver 40 serves as an even-numbered receiver processing performing unit which performs the even-numbered receiver processing 100 on the numbered data 130 when the least significant bit of the data number is "0". The step 90 of the multifrequency signal receiver 40 serves as an odd-numbered receiver processing performing unit which performs the odd-numbered receiver processing 90 on the numbered data 130 when the least significant bit of the data number is "1".

In the manner which is described above, the multifrequency signal receiver 40 realizes a processing as shown in FIG. 2. Different from the above-mentioned Patent Document 2, the present invention discloses a method of making time division on a multifrequency signal detection processing twice regardless of recognition a timing of ON/OFF time of the multifrequency signal. In addition, different from the above-mentioned Patent Document 3, the present invention realizes an increase of a reception count in the multifrequency signal receiver 40 by temporally divining data supplied to the multifrequency signal receiver 40 at the same sampling interval into two and by using them.

In the telephone communications system according to the first exemplary aspect of this invention, the above-mentioned multifrequency signal receiver 40 may comprise a numbering processing unit numbering the low-pass filtered data to produce numbered data with a data number, a least significant bit discriminating unit discriminating a least significant bit of the data number added to the numbered data, an even-numbered receiver processing performing unit performing the even-numbered receiver processing on the numbered data when the least significant bit of the data number is "0", and an odd-numbered receiver processing performing unit performing the odd-numbered receiver processing on the number data when the least significant bit of the data number is "1".

In the multifrequency signal receiving method according to the second exemplary aspect of this invention, the performing of the receiver processing may comprise numbering the low-pass filtered data to produce numbered data with a data number, discriminating a least significant bit of the data number added to the numbered data, performing the even-numbered receiver processing on the numbered data when the least significant bit of the data number is "0", and performing the odd-numbered receiver processing on the number data when the least significant bit of the data number is "1".

In addition, it may execute the 8 kHz low-pass filter 30 and the multifrequency signal receiver 40 in accordance with a program stored in a memory portion (ROM or RAM). Alternatively, it may execute only the multifrequency signal receiver 40 in accordance with a program stored in a memory portion (ROM or RAM).

An exemplary advantage according to the invention is to substantially double a reception count compared with a conventional one because the multifrequency signal receiver alternately receives signal data.

While the invention has been particularly shown and described with reference to an exemplary embodiment thereof, the invention is not limited to this embodiment. It will be understood by those of ordinary skill in the art that various changes in form and details may be made therein without departing from the sprit and scope of the present invention as defined by the claims. For example, this invention is applicable to a system having a sampling frequency of 8 kHz or more.

What is claimed is:

1. A telephone communications system having a function for receiving a multifrequency signal, comprising:
    a quantizing device quantizing said multifrequency signal at a sampling frequency which is twice or more as large as a sampling frequency necessary for sampling said multifrequency signal to produce quantized data;
    a low-pass filter low-pass filtering said quantized data at a cutoff frequency higher than a maximum frequency of said multifrequency signal to produce low-pass filtered data; and
    a multifrequency signal receiver alternately performing an odd-numbered receiver processing and an even-numbered receiver processing on said low-pass filtered data,
    wherein said multifrequency signal receiver comprises:
    a numbering processing unit numbering said low-pass filtered data to produce numbered data with a data number;
    a least significant bit discriminating unit discriminating a least significant bit of the data number added to said numbered data;
    an even-numbered receiver processing performing unit performing the even-numbered receiver processing on said numbered data when the least significant bit of the data number is "0"; and
    an odd-numbered receiver processing performing unit performing the odd-numbered receiver processing on said number data when the least significant bit of the data number is "1".

2. The telephone communications system as claimed in claim 1, wherein the sampling frequency of said quantizing device is 8 kHz or more.

3. The telephones communication system as claimed in claim 2, wherein the cutoff frequency of said low-pass filter is equal to 2 KHz.

4. A method of receiving a multifrequency signal, comprising:
    quantizing said multifrequency signal at a sampling frequency which is twice or more as large as a sampling frequency necessary for sampling said multifrequency signal to produce quantized data;
    low-pass filtering said quantized data at a cutoff frequency higher than a maximum frequency of said multifrequency signal to produce low-pass filtered data; and
    alternately performing an odd-numbered receiver processing and an even-numbered receiver processing on said low-pass filtered data,
    wherein said performing of the receiver processing comprises:
    numbering said low-pass filtered data to produce numbered data with a data number;
    discriminating a least significant bit of the data number added to said numbered data;
    performing the even-numbered receiver processing on said numbered data when the least significant bit of the data number "0"; and
    performing the odd-numbered receiver processing on said number data when the least significant bit of the data number is "1".

5. The method as claimed in claim 4, wherein the sampling frequency in said quantizing is 8 kHz or more.

6. The method as claimed in claim 5, wherein the cutoff frequency in said low-pass filtering is equal to 2 KHz.

7. A non-transitory computer readable recording medium for storing a program for use in a telephone communications system having a function of receiving a multifrequency signal, said telephone communications system comprising a quantizing device for quantizing said multifrequency signal at a sampling frequency which is twice or more as large as a sampling frequency necessary for sampling said multifrequency signal to produce quantized data, said program causing said telephone communications system to execute the steps of:
- low-pass filtering said quantized data at a cutoff frequency higher than a maximum frequency of said multifrequency signal to produce low-pass filtered data; and
- alternately performing an odd-numbered receiver processing and an even-numbered receiver processing on said low-pass filtered data,
- wherein said performing step of the receiver processing comprises the steps of:
  - numbering said low-pass filtered data to produce numbered data with a data number;
  - discriminating a least significant bit of the data number added to said numbered data
  - performing the even-numbered receiver processing on said numbered data when the least significant bit of the data number is "0"; and
  - performing the odd-numbered receiver processing on said number data when the least significant bit of the data number is "1".

8. The non-transitory computer readable recording medium as claimed in claim 7, the sampling frequency of said quantizing device is 8 kHz or more, wherein the cutoff frequency in said low-pass filtering is equal to 2 KHz.

9. A non-transitory computer readable recording medium for storing a program for use in a telephone communications system having a function of receiving a multifrequency signal, said telephone communications system comprising a quantizing device for quantizing said multifrequency signal at a sampling frequency which is twice or more as large as a sampling frequency necessary for sampling said multifrequency signal to produce quantized data and a low-pass filter for low-pass filtering said quantized data at a cutoff frequency higher than a maximum frequency of said multifrequency signal to produce low-pass filtered data, said program causing said telephone communications system to execute the step of:
- alternately performing an odd-numbered receiver processing and an even-numbered receiver processing on said low-pass filtered data,
- wherein said performing step of the receiver processing comprises the steps of:
  - numbering said low-pass filtered data to produce numbered data with a data number;
  - discriminating a least significant bit of the data number added to said numbered data;
  - performing the even-numbered receiver processing on said numbered data when the least significant bit of the data number is "0"; and
  - performing the odd-numbered receiver processing on said number data when the least significant bit of the data number is "1".

* * * * *